United States Patent [19]
Janssen

[11] 3,920,436

[45] Nov. 18, 1975

[54] ARTIFICIAL PROTECTIVE ENVIRONMENT FOR PLANTS

[75] Inventor: Edward W. Janssen, Village of Roseville, Minn.

[73] Assignee: Minnesota Mining and Manufacturing Company, St. Paul, Minn.

[22] Filed: Aug. 7, 1972

[21] Appl. No.: 278,534

[52] U.S. Cl. ............... 71/65; 47/57.6; 47/DIG. 9; 71/79; 71/DIG. 1; 427/4
[51] Int. Cl.² .......................................... A01N 5/00
[58] Field of Search............ 117/100 A, 3, 161 KP; 47/DIG. 9, 57.6; 71/77, 79, 65, DIG. 1; 427/4

[56] References Cited
UNITED STATES PATENTS

| | | | |
|---|---|---|---|
| 2,901,467 | 8/1959 | Croco | 117/161 KP X |
| 3,113,399 | 12/1963 | Eversole et al. | 47/57.6 X |
| 3,401,133 | 9/1968 | Grace et al. | 117/161 KP X |
| 3,539,373 | 11/1970 | Cooke | 117/3 |
| 3,608,238 | 9/1971 | Reuter | 47/1.2 |
| 3,621,612 | 11/1971 | Porter | 47/57.6 X |
| 3,812,619 | 5/1974 | Wood et al. | 47/58 |

*Primary Examiner*—William D. Martin
*Assistant Examiner*—Dennis C. Konopacki
*Attorney, Agent, or Firm*—Alexander, Sell, Steldt & DeLaHunt

[57] ABSTRACT

Plants are contacted with a fluid agent comprising a hydrophilic urethane prepolymer which is then cured in the presence of water to form a thin discontinuous coating of a water-insoluble, hydrophilic polyurethane-polyurea polymer, thereby providing an artificial protective environment for the plant or portion thereof contacted, which is not detrimental to germination or growth. Agrichemicals such as herbicides, growth promoters, insecticides, or other additives can be included as desired for specific plant growth, seeds, or conditions.

12 Claims, No Drawings

ARTIFICIAL PROTECTIVE ENVIRONMENT FOR PLANTS

FIELD OF THE INVENTION

This invention relates to plant growth and more particularly to providing a beneficial artificial protective environment for plants.

BACKGROUND OF THE INVENTION

Seedlings which are nursery-grown and cultivated for subsequent transplantation often have a high mortality rate upon actual transplanting. Many planting man-hours, as well as seedlings themselves, are thereby wasted. A major factor contributing to their excessive mortality rate is the desiccation of the hair roots of the seedlings by the action of heat and wind while the roots are exposed during the transplantation process. The root systems can thereby become damaged to the point where transplanting the seedling is futile. In present practice seedlings are grouped in bunches around which is packed moss or some similar material which is constantly moistened with water. While affording protection to the seedlings prior to actual transplanting, very little protection is available to individual seedlings during transplanting.

Additionally, when seedlings are planted in arid soil, normal transpiration (i.e., the emission of water vapor from the surface of the exposed portions of the seedlings such as leaves) occurs at such a rate that moisture originally contained in the root systems is quickly dissipated, resulting in the death of the seedlings. Frequent watering of the transplanted seedling is therefore required, a task not always easily accomplished.

Application of agrichemicals such as insecticides to the leaves and other exposed portions of mature trees and plants on a small scale, e.g., in a single household, or on a large scale, e.g., an orchard, is generally accomplished by area liquid spraying or particulate dusting. One of the attendant problems with this procedure is that the agrichemicals do not adhere well to the contracted trees or plants. Subsequent rainfall thereby washes away the agrichemicals, necessitating relatively frequent and costly applications. Additionally, the agrichemicals contained in normal runoff water may be toxic to animal, plant, or aquatic life, making such practices extremely undesirable from an ecological standpoint.

Seed, such as grass seed, is generally easily washed away from a planting site during rainfall because the seed is buoyant in water. Therefore, the seed generally must be covered with a porous material, typically hay or burlap sacks to prevent removal during subsequent rainfall. Also, precision seed planting is desirable in certain instances. Such planting, however, is generally unattainable because individual seeds are too small to be adaptable to precision planting methods.

While it would be extremely desirable to provide a protective environment for plants or portions thereof, such as the roots, stems, and leaves of transplantable seedlings, exposed portions of mature plants and trees, and seeds, such has heretofore not been available. It is known that certain polyurethane foams will support plant growth when substituted for soil, black dirt, or other typical culture medium; see for example, U.S. Pat. No. 3,608,238. Such teachings generally require a rigid foam construction of a predominantly open-celled nature to allow air, water, and added nutrients to reach the plant's root system. To attain this end, components such as foam catalysts and blowing agents must be utilized.

SUMMARY OF THE INVENTION

In accordance with the invention there is provided in one embodiment a method for affording an artificial protective environment for plants comprising (1) contacting plants or portions thereof with a fluid agent comprising a hydrophilic urethane prepolymer having the formula $$Y_1[(RO)_o - Y_2(NCO)_p]_z \qquad 1$$

where $Y_1$ is an active hydrogen-free residue of a compound having a plurality of active hydrogen atoms, $(RO)_o$ is a hydrophilic polyoxyalkylene chain having a plurality of oxyethylene units $o$ is the number of oxyalkylene units in said chain, $Y_2$ is an organic linkage bonding said chain to the isocyanate moieties shown in the formula, $p$ is an integer 1 to 5, and $z$ is equal to the number of hydrogen atoms in the compound from which $Y_2$ is derived, and (2) curing the prepolymer in the presence of water to form a thin discontinuous coating of a water-insoluble hydrophilic polyurethane-polyurea polymer which is adhesively bonded to the portions of the plant contacted.

In another embodiment a composition is provided comprising a mixture of a solvent solution of the hydrophilic prepolymer of formula I and an agrichemical such as a herbicide, insecticide, etc.

The polymeric coating generally is discontinuous so as to allow normal plant respiration during germination and growth and is hydrophilic such that water is absorbed by the coating. Suitable agrichemicals which can be contained in the coating are slowly leached out by the water absorbed to become available to the coated plant.

The prepolymer agent is advantageously a one-part system, requiring no elaborate equipment for preparation of the agent or its application to the plant parts, and requiring no catalyst or co-reactant material other than water.

DETAILED DESCRIPTION OF THE INVENTION

The term plant as used herein includes both reproductive and vegetative parts of plants, and as such includes seeds as well as the roots, stems, and leaves or greenery of plants, including trees.

The urethane prepolymers useful in this invention in general can be prepared by reacting a material having a plurality of active hydrogen atoms, such as a polygol, with an amount of organic polyisocyanate (or polyisothiocyanate) in excess of stoichiometry. The equivalent ratio of isocyanate moiety, —NCO, to active hydrogen is at least 2/1, and preferably is at least 2.1/1 to 2.5/1, and can be as high as 4/1 or even higher.

The prepolymers useful in this invention are those which are water-miscible and can be expressed in terms of the formula $$Y_1[(RO)_o - Y_2(NCO)_p]_z \qquad 1$$

wherein $Y_1$ is an active hydrogen-free residue of a compound having a plurality of active hydrogen atoms, e.g., polyhydroxy alkane or polyamino alkane such as ethylene glycol or ethylene diamine; $(RO)_o$ is a hydrophilic polyoxyalkylene chain having a plurality of oxyethylene units, such as (1) a polyoxyethylene chain (the preferred type of chain), (2) a chain having alternating blocks or backbone segments of oxyethylene and oxypropylene units, or (3) a chain of randomly distributed oxyethylene and oxypropylene units; $o$ is the number of oxyalkylene units in the polyoxyalkylene chain; $Y_2$ is a linkage or bridge the function of which is to bond the polyoxylene chain to the isocyanate moieties shown in the formula; $p$ is the number of isocyanate moieties and generally will be 1 to 5, preferably 1 to 3; and $z$ is a number equal to the functionality, or number of this plurality of active hydrogen atoms, in the compound (e.g., said polyhydroxyalkane or polyaminoalkane) which provides the residue $Y_1$ and generally $z$ will be 2 to 6. Where the prepolymer is prepared by reacting a polyol and a polyisocyanate, the polyoxyalkylene chain will be terminated with $-OC(O)NH-R'(-NCO)_p$, where $-OC(O)NH-$ is a carbamate (or urethane) group resulting from the reaction of a hydroxyl group from the polyol precursor with an isocyanate moiety from the polyisocyanate precursor R' is the residue or nucleus of the polyisocyanate precursor (which will be tolylene where the polyisocyanate precursor is tolylene diisocyanate), and $p$ is an integer equal to $q-1$, where $q$ is the number of isocyanate moieties of the polyisocyanate precursor.

The term "active hydrogen atom" as used herein refers to a hydrogen atom which reacts with the isocyanate moiety under urethane or urea bond forming conditions. The term "water-miscible" in this context means the prepolymer is dispersible (or soluble) in water.

A useful class of water-miscible prepolymers within the scope of formula I are those of the formula

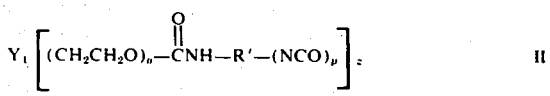

$$Y_1\left[(CH_2CH_2O)_o-\overset{\overset{\displaystyle O}{\|}}{C}NH-R'-(NCO)_p\right]_z \qquad \text{II}$$

where $Y_1$, R', $o$, and $z$ are as defined above, R' is tolylene, $o$ is the number of oxyethylene units in the polyoxyethylene chain, $p$ is 1 to 3, and $z$ is equal to the functionality, e.g., 2 or 3, of the compound from which $Y_1$ is derived.

Another class of water-miscible prepolymers within the scope of formula I and useful in the invention can be expressed by the formula

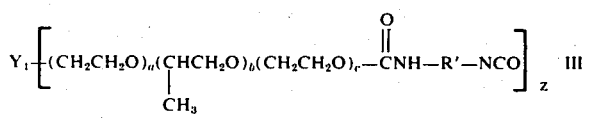

$$Y_1\left[(CH_2CH_2O)_a(\underset{\displaystyle CH_3}{\underset{|}{C}}HCH_2O)_b(CH_2CH_2O)_c-\overset{\overset{\displaystyle O}{\|}}{C}NH-R'-NCO\right]_z \qquad \text{III}$$

where $Y_1$, R', and $z$ are as defined above in formula II, and $a$, $b$, and $c$ are integers such that the ratio of $(a+b)/b$ is greater than 1 (and thus the prepolymers are water-miscible).

Commercially available polyol precursors useful in making the above-described water-miscible isocyanate-terminated prepolymers used in this invention are the hydrophilic poly-(oxyethylene-oxypropylene) polyols sold under the trademark "Pluronic", such as Pluronic L35, F38, and P46, available from Wyandotte Chemical Co. and hydrophilic polyols with heteric oxyethylene-oxypropylene chains sold under the tradename "Polyol Functional Fluids," such as WL-580, WL-600, and WL-1400, available from the Jefferson Chemical Co. Generally, the hydrophilic or water-soluble oxyethylene-containig polyols to be used will have molecular weights of between 600 and 3000; preferably they will have molecular weights of 600 to 2000. Lower molecular weight polyols, i.e., below about 600, are liquids having decreasing solubility in water. When used in this invention they provide polymers with decreased hydrophilicity. Conversely, higher molecular weight polymers, i.e., greater than about 2000, tend to provide extremely hydrophilic polymers, but the cured polymer coating may be structurally weak. A preferred polyol (particularly when reacted with tolylene diisocyanate to form the prepolymer) is a polyethylene glycol having a molecular weight of about 1000, sold under the tradename "Carbowax 1000" by the Union Carbide Chemical Co.

Polyisocyanates which can be used to prepare the isocyanate-terminated prepolymers used in this invention and described above include conventional alphatic, alicyclic, and aromatic polyisocyanates. The preferred polyisocyanates are aromatic polyisocyanates because the prepolymers made therefrom will generally react faster with water. One of the most useful polyisocyanate compounds which can be used for this purpose is tolylene diisocyanate, particularly as a blend of 80:20 weight percent of toluene-2,4-diisocyanate and toluene-2, 6-diisocyanate. These polyisocyanates are commercially available under the tradenames "Hylene TM", "Nacconate 80", and "Mondur TD-80". A 65:35 weight percent blend of the 2,4-and 2,6-isomers is also useful. Other useful aromatic polyisocyanate compounds which can be used are other isomers of tolylene diisocyanate, diphenyl-methane-4, 4'-diisocyanate, m- or p-phenylene diisocyanate, and 1,5-napthalene diisocyanate. An example of a suitable aliphatic polyisocyanate is hexamethylene-1,6-diisocyanate. Polymeric polyisocyanates such as polymethylene polyphenyl polyisocyanates can also be used, such as those sold under the tradenames "Mondur MRS" and "PAPI". A list of useful commercially available polyisocyanates is found in "Encyclopedia of Chemical Technology," by Kirk and Othmer, 2nd Edition, Volume 12, Interscience Pub., (1967), at pp. 46–47.

Water is the only co-reactant required to effect the formation of the cured hydrophilic polyurethane-polyurea polymer. The mechanism of the urethane prepolymer-water reaction is well known. It results in the formation of urea linkages, the water acting as a chain extender, and in the evolution of carbon dioxide. This carbon dioxide evolution during the curing reaction provides the discontinuous appearance of the thin polymeric coating.

The prepolymers used in this invention are generally viscous liquids and it is therefore required to employ the same in the form of a solution in a suitable solvent which is non-reactive with the isocyanate moiety. Thus, organic solvents, or other organic compounds which contain active hydrogen atoms are to be avoided in making up and using the prepolymer agents of this invention. Generally, useful solvents can be water-miscible polar organic solvents, preferably volatile at ambient conditions. Alternatively, the solvent can be a water-immiscible organic solvent which volatilizes under ambient conditions and escapes into the atomosphere. Representative solvents which can be used include acetone, tetrahydrofuran, methyl ethyl ketone, methylene chloride, toluene, and methoxyethylacetate.

The concentration of prepolymer in the application solution should be on the order of about 25 to 90 weight percent for best results. For spray applications on leaves or other exposed plant parts, the solution can, in general, be applied so as to provide a light coating on the parts contacted. The water required for curing of the prepolymer agent can be added to the prepolymer during spraying, for example, by means of a mixing spray nozzle, or by separate spray nozzles wherein the individual spray steams impinge on each other during application. Alternatively, water can be applied to the plant to be contacted prior to application of the prepolymer agent. Alternatively, normal atmospheric humidity can be utilized to effectively cure the applied film since the prepolymer is hydrophilic and will therefore absorb atmospheric moisture. Although a longer cure time is required for the latter method (e.g., 1 to 24 hours depending on atmospheric conditions), minimum application time and equipment is required.

In protecting seedlings scheduled for transplantion, a spray can conveniently be applied to the moist roots, or any other convenient contacting method can be utilized, such as immersion of the root system in water followed by immersion into the prepolymer agent and removal, whereupon a polymeric film is formed about the root system upon curing. Generally as little as 1 gram of prepolymer will effectively coat the roots of a two year old transplantable seedling.

In application to seeds, the invention can be effectuated on conventional equipment, for example, a tumbler apparatus typically utilized for the coating of pills or candy. Typically, seed and polymer can be introduced to the tumbler and contacted. To this, water in the form of liquid or vapor is added, followed by the addition of a fine-grained filler to prevent agglomeration of the coated seeds. The filler typically can be crushed rock or similar insoluble material. If desirable, this process can be successively repeated to obtain coated seeds of whatever diameter desired so as to utilize the seed for precision planting schemes. Generally, about .5 to 10 grams of prepolymer can be utilized to effectively coat 100 grams of seed, and water in a 1:1 ratio by weight of prepolymer will effectively cure the prepolymer. Approximately 2 grams of crushed rock or equivalent per 100 grams of seed is sufficient to prevent agglomeration. The quantity of prepolymer required depends on the porosity and surface area of the seed type being contacted.

The amount of water required to effectively cure the hydrophilic prepolymer is approximately only 1.2 to 1.5 weight percent of the prepolymer. An excess of water of 10 to 20 times this amount or even greater can be utilized without detrimental effect. Since the prepolymer is hydrophilic, it will in fact absorb moisture from the air and effectively cure.

The time required for curing of the prepolymer is related to the temperature of the water co-reactant. Room temperature (i.e., 70°F.) liquid water will effect a cure generally in about 3 to 5 minutes. Cooler water will require a longer cure time, e.g. with 40°F. water, approximately 9–10 minutes cure time is required. With steam, generally less than 1 minute is required. With atmospheric humidity or water vapor, cure is effected in from 1 to 24 hours depending on atmospheric conditions.

Conventional agrichemicals can be conveniently included in the prepolymer application solution. For example, conventional fungicides, herbicides, root hormones, lime, sulfur, fertilizers, etc., can be added to the solution in powder form. Alternatively, if the agrichemical is reactive with the prepolymer, the agrichemical can be included in the water co-reactant and applied by means of a mixing spray nozzle or by separate spray nozzles as hereinbefore discussed. The agrichemical should not be one which will have a deleterious effect on the cured polymer. The agrichemicals will be retained in the cured hydrophilic polymeric film and will generally be leached out of the coating through water absorption of the hydrophilic polymer, thereby effecting a slow release of the chemicals to the plant. The concentration of agrichemical in the solution depends on the strength of the conventional agrichemical utilized. For example, with a root hormone only 1 gram per gallon of application solution may be satisfactory. With conventional herbicides, a 1:1 weight ratio of prepolymer to herbicide may be required.

Where plants such as trees or shrubs are transplanted in an arid environment, transpiration from the exposed plant portions generally occurs at a rapid rate. The root systems furnishing the moisture to the exposed portions are thereby rapidly relieved of vital moisture, and because the root system is of inadequate growth, the plant will not survive. While spraying of the exposed plant with the prepolymer solution generally will slow the transpiration rate down, growth inhibitors can be included to reduce the plant's growth rate so as to allow adequate root structure to be formed beneath the soil, thereby greatly increasing the plant's chances for survival.

Plant elements contacted are not damaged by the curing reaction of the prepolymer, i.e., the prepolymer is not toxic to the plant tissue. In addition, water is the only coreactant required, i.e., no external reaction catalyst which may be toxic to plant growth is necessary.

In the following examples, intended to illustrate the invention, all parts and percentages are by weight unless otherwise stated.

EXAMPLE 1

One thousand parts by weight of a polyoxyethylene diol with a tradename of Carbowax 1000, having a molecular weight of about 1000 is stirred with 351 parts of tolylene diisocyanate (an 80/20 weight percent mixture of the 2,4-and 2,6-isomers respectively) under anhydrous conditions for about 2 hours, and the reaction mixture is allowed to stand for several days. The resulting urethane prepolymer is a viscous liquid at 25°C. having a structure as in formula II, supra, where $Y_1$ is the residue of ethylene glycol, R is tolylene, $o$ is about 21, $p$ is 1, and $z$ is 2.

Approximately 1000 seedlings each of red pine, white pine, jack pine, norway pine, and white, blue and black spruce, all designated as 2/0 seedlings (i.e. 2 years in the nursery field, and no greenhouse growth period) were separated into equal groups or lots for each type of seedling.

The viscous liquid prepolymer prepared above is then solvated with acetone to make a 70% by weight application solution.

Upon moistening the roots of approximately a third (or 300) seedlings of each of the types of conifers listed above, approximately 1 gram of prepolymer is deposited on the roots of each seedling utilizing a conventional portable plant sprayer at approximately 30 pounds per square inch air pressure. The sprayer is a Montgomery Ward Co. Model 89-26484 Portable Paint Sprayer. The prepolymer reacts with the water adhering to the roots, creating a thin hydrophilic coating on the roots of the seedlings.

Following the same procedure with the second third (or about 300) seedlings, approximately 3 grams of prepolymer is deposited on each seedling followed by curing.

The last third of the seedlings are moistened with water, but no prepolymer is applied to the roots.

The sprayed and unsprayed seedlings are then placed in a drying atmosphere of 120°F. for 30 minutes, followed by planting in the conventional manner.

After approximately a 2-month period, the unsprayed seedlings indicate about a 30% mortality rate, while the polymer-coated seedlings have approximately a 5% mortality rate. There is no discernible difference between the seedlings having 1 gram of prepolymer deposition and those having 3 grams of prepolymer deposition.

EXAMPLE 2

An aerosol container is prepared with a 70% by weight solution of the prepolymer of example 1 in acetone. Also included in the aerosol is a conventional compound for the treatment of flower leaves to prevent powdery mildew, black leaf spot, and aphids, commercially sold by the Chevron Chemical Co. under the tradename "Ortho Rose and Flower Dust." The aerosol mixture contains 20 grams of the Ortho Dust per 100 grams of hydrophilic prepolymer.

In a rose plot containing 16 rose bushes, 4 of the bushes are treated with the aerosol spray, 4 are untreated and 8 are treated conventionally with the Ortho Dust.

During the following 45 days, the 8 plants treated conventionally with Ortho Dust are treated as per the manufacturer's recommendations, i.e., every 10 days and after every rain. In this manner, treatment is applied 5 times during the period, there being one rainfall occurring. Approximately one pound of the dust was utilized during the 45 day period, and no powdery mildew, black leaf spot, or aphids were discovered on the bushes.

The prepolymer-Ortho Dust aerosol sprayed bushes contain a pebbly-textured discontinuous coating on the leaves. During the 45 day test period, new growth is noted as having some aphids, and the new growth is touched up with the aerosol spray. In all, about 200 grams of the prepolymer-Ortho Dust mixture are utilized, including the initial application and two subsequent applications to new growth.

The four untreated rose bushes were infested with powdery mildew and black spot, as well as aphids on the new growth.

While the treated bushes are protected equally as well with the conventional Ortho Dust or the hydrophilic prepolymer-Ortho Dust combination, only about one-tenth of the amount of chemical dust is required when utilized in conjunction with the hydrophilic prepolymer.

EXAMPLE 3

A 50% by weight solution of the prepolymer of example 1 in acetone is prepared.

In conventional equipment utilized for the coating of tabletized medicines, grass seed is tumbled with the prepolymer solution, approximately 2 grams of prepolymer being utilized per 100 grams of seed. After tumbling for approximately 3 to 5 minutes, about 5 grams of water is introduced in the tumbler. The prepolymer starts to cure, and after about 60 seconds the coated seeds begin to stick together and to the walls of the tumbler. At this time 2 grams of taconite powder per 100 grams of seed is added to the tumbler and tumbling is continued for 3 to 5 minutes. The coated seeds are sufficiently dense to sink in water, while uncoated seeds float on the surface of the water.

The coated seed germinates in the normal manner upon planting in a test plot.

The polymeric coatings of this invention are preferably substantially non-cellular in structure. Cellular structures, either open or closed cell, may be present however. Due to the inherent hydrophilicity of the prepolymers employed herein, the coatings need not have the degree of open cell structure as specified in U.S. Pat. No. 3,608,238.

What is claimed is:

1. A method for providing an artificial protective environment for a plant or portion thereof comprising contacting said plant or portion thereof with a fluid agent comprising a hydrophilic urethane prepolymer of the formula

where $Y_1$ is an active hydrogen-free residue of a compound having a plurality of active hydrogen atoms, $(RO)_o$ is a hydrophilic polyoxyalkylene chain having a plurality of oxyethylene units, $o$ is the number of oxyalkylene units in said chain, $Y_2$ is an organic linkage bonding said chain to the isocyanate moiety shown in the formula, $p$ is 1 to 5, and $z$ is equal to the number of hydrogen atoms in the compound from which $Y_2$ is derived, and curing said prepolymer in the presence of water to form a thin, discontinuous, water-insoluble, hydrophilic polyurethane-polyurea polymer coating which is adhesively bonded to said plant or portion thereof.

2. The method according to claim 1, wherein said contacting is by spraying.

3. The method according to claim 1, wherein said plant is a seed.

4. The method according to claim 1, wherein said fluid agent also contains an agrichemical.

5. The method according to claim 4, wherein said agrichemical is a herbicide.

6. A method for providing an artificial protective environment for a plant or portion thereof comprising contacting said plant or portion thereof with a fluid agent comprising a hydrophilic urethane prepolymer of the formula

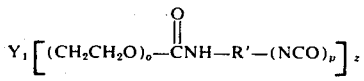

where $Y_1$ is an active hydrogen atom-free residue of a compound having a plurality of active hydrogen atoms, $R'$ is an aromatic nucleus derived from an organic polyisocyanate, $o$ is the number of oxyethylene units shown in said formula, $p$ is 1 to 3, and $z$ is 2 to 3, and curing said prepolymer in the presence of water to form a thin, discontinuous, water-insoluble, hydrophilic polyurethane-polyurea polymer coating on said plant or portion thereof.

7. The method according to claim 6, wherein said contacting is by spraying.

8. The method according to claim 6, wherein said plant is a seed.

9. The method according to claim 6, wherein said fluid agent also contains an agrichemical.

10. The method according to claim 9, wherein said agrichemical is a herbicide.

11. An article comprising a plant having a coating on at least a portion thereof of a thin, discontinuous water-insoluble, hydrophilic polyurethanepolyurea polymer, said polymer comprised of the reaction product of water and a hydrophilic urethane prepolymer said prepolymer having the formula $$Y_1[(RO)_o - Y_2(NCO)_p]_z$$

where $Y_1$ is an active hydrogen-free residue of a compound having a plurality of active hydrogen atoms, $(RO)_o$ is a hydrophilic polyoxyalkylene chain having a plurality of oxyethylene units, $o$ is the number of oxyalkylene units in said chain, $Y_2$ is an organic linkage bonding said chain to the isocyanate moieties shown in the formula, $p$ is 1 to 5, and $z$ is equal to the number of hydrogen atoms in the compound from which $Y_2$ is derived.

12. The article of claim 11 wherein said coating further includes an agrichemical.

* * * * *